United States Patent
Ito et al.

(10) Patent No.: US 12,116,457 B2
(45) Date of Patent: *Oct. 15, 2024

(54) POLY(BIPHENYL ETHER SULFONE) RESIN, PRODUCTION METHOD THEREFOR, AND MELT-MOLDED ARTICLE

(71) Applicant: SUMITOMO CHEMICAL COMPANY, LIMITED, Tokyo (JP)

(72) Inventors: Kazuyuki Ito, Tsukuba (JP); Kensuke Maekawa, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 743 days.

This patent is subject to a terminal disclaimer.

(21) Appl. No.: 17/278,175

(22) PCT Filed: Sep. 20, 2019

(86) PCT No.: PCT/JP2019/036919
§ 371 (c)(1),
(2) Date: Mar. 19, 2021

(87) PCT Pub. No.: WO2020/066875
PCT Pub. Date: Apr. 2, 2020

(65) Prior Publication Data
US 2021/0347942 A1  Nov. 11, 2021

(30) Foreign Application Priority Data

Sep. 26, 2018  (JP) ................ 2018-180560

(51) Int. Cl.
*C08G 65/40*  (2006.01)

(52) U.S. Cl.
CPC .................. *C08G 65/40* (2013.01)

(58) Field of Classification Search
CPC ........... C08G 75/23; C08G 2261/3444; C08G 18/3872; C08G 65/4093; C08L 81/06; C08L 2201/08; C08L 2203/30
See application file for complete search history.

(56) References Cited

U.S. PATENT DOCUMENTS

| | | | |
|---|---|---|---|
| 5,212,264 A | 5/1993 | Hoffmann et al. | |
| 2012/0190764 A1 | 7/2012 | Kohinata et al. | |
| 2015/0065677 A1 | 3/2015 | El-Toufaili et al. | |
| 2016/0152776 A1 | 6/2016 | Weber et al. | |

FOREIGN PATENT DOCUMENTS

| | | |
|---|---|---|
| CA | 2022814 A1 | 2/1991 |
| CN | 102482412 A | 5/2012 |
| EP | 0412934 A2 | 2/1991 |
| JP | 59-136326 A | 8/1984 |
| JP | 01-318040 A | 12/1989 |
| JP | 03-084032 A | 4/1991 |
| JP | 2002-525406 A | 8/2002 |
| JP | 2004-107606 A | 4/2004 |
| JP | 2004-263154 A | 9/2004 |
| JP | 2004-285302 A | 10/2004 |
| JP | 2016-524019 A | 8/2016 |
| WO | 00/18824 A1 | 4/2000 |

OTHER PUBLICATIONS

India Office Action issued in corresponding India Patent Application No. 202147012197, dated Oct. 21, 2022, with English translation.
International Search Report issued in corresponding International Patent Application No. PCT/JP2019/036919, dated Dec. 24, 2019, with English translation.
Extended European Search Report issued in corresponding European Patent Application No. 19865359.4-1102, dated May 24, 2022.
Japanese Notice of Reasons for Refusal issued in corresponding Japanese Patent Application No. 2018-180560, dated Jun. 14, 2022, with English translation.
Japanese Notice of Reasons for Refusal issued in corresponding Japanese Patent Application No. 2018-180560, dated Dec. 6, 2022, with English translation.
European Office Action issued in corresponding European Patent Application No. 19865359.4-1102, dated May 31, 2023.
Extended European Search Report issued in corresponding EP Patent Application No. 19864177.1, dated May 24, 2022.
Non-Final Office Action issued in U.S. Appl. No. 17/277,556, dated May 1, 2023.
European Office Action issued in corresponding EP Patent Application No. 19864177.1, dated Jun. 23, 2023.
India Office Action issued in corresponding India Patent Application No. 202147012107, dated Jun. 17, 2022.
Notice of Reasons for Refusal issued in corresponding Japanese Patent Application No. 2020-549119, dated Feb. 14, 2023, with English translation.

(Continued)

*Primary Examiner* — Shane Fang
(74) *Attorney, Agent, or Firm* — Rimon P.C.

(57) ABSTRACT

The present invention relates to a poly(biphenyl ether sulfone) resin substantially comprising a repeating structure of the following formula (1), and having a spin-lattice relaxation time $T_{1L}$ of a long component of 24 s or more, which is calculated from decay of a signal intensity I (τ) corresponding to a chemical shift of 129 ppm by acquiring a $^{13}$C-NMR spectrum by a Torchia pulse sequence using an NMR device for solid sample measurement and changing a value of a waiting time τ in the pulse sequence, (1)

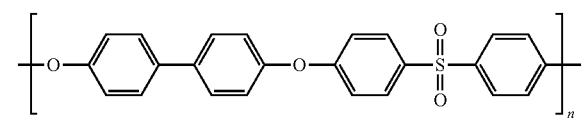

wherein n represents an integer of 1 or more.

6 Claims, No Drawings

(56) References Cited

OTHER PUBLICATIONS

International Search Report issued in corresponding International Patent Application No. PCT/JP2019/036956, dated Dec. 24, 2019, with English translation.
Chinese Office Action issued in corresponding Chinese Patent Application No. 201980061944.0, dated Nov. 29, 2022, with English translation.

POLY(BIPHENYL ETHER SULFONE) RESIN, PRODUCTION METHOD THEREFOR, AND MELT-MOLDED ARTICLE

TECHNICAL FIELD

The present invention relates to a poly(biphenyl ether sulfone) resin and a method for producing the same, and a melt-molded article.

Priority is claimed on Japanese Patent Application No. 2018-180560, filed Sep. 26, 2018, the content of which is incorporated herein by reference.

BACKGROUND ART

A molded article of a poly(biphenyl ether sulfone) resin having a repeating unit represented by the following formula (1-1)

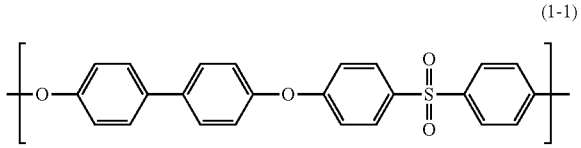

(1-1)

is excellent in heat resistance, impact resistance, solvent resistance and the like. Further, it is also known that, in general, the higher the molecular weight of a poly(biphenyl ether sulfone) resin, the better the heat resistance and impact resistance of the obtained molded article.

As a method for producing a poly(biphenyl ether sulfone) resin, for example, methods in which 4,4'-dihydroxybiphenyl and a 4,4'-dihalogenodiphenyl sulfone compound are polymerized in an aprotic polar solvent in the presence of potassium carbonate have been reported in Patent Documents 1 to 3 and the like.

CITATION LIST

Patent Documents

[Patent Document 1] JP 2004-107606 A
[Patent Document 2] JP 2004-263154 A
[Patent Document 3] JP 2002-525406 A

SUMMARY OF THE INVENTION

Problems to be Solved by the Invention

A molded article of a poly(biphenyl ether sulfone) resin excellent in heat resistance, impact resistance, solvent resistance and the like is expected to be applied to applications used in a high temperature atmosphere. However, it has become clear that when a molded article obtained from a conventional poly(biphenyl ether sulfone) resin is thermally annealed, the impact resistance decreases.

An object of the present invention is to provide a poly(biphenyl ether sulfone) resin capable of providing a melt-molded article having excellent impact resistance and little change in impact resistance before and after thermal annealing, that is, less susceptible to thermal aging; and a method for producing the same; and a melt-molded article having excellent impact resistance and less susceptible to thermal aging.

Means to Solve the Problems

In order to solve the above problems, the present invention adopts the following configurations.

[1] A poly(biphenyl ether sulfone) resin substantially comprising a repeating structure of the following formula (1) and having a spin-lattice relaxation time $T_{1L}$, calculated from the following <Method for calculating spin-lattice relaxation time $T_{1L}$> of 24 s or more.

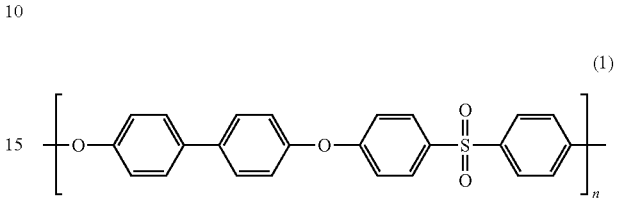

(1)

[In the formula, n represents an integer of 1 or more.]
<Method for Calculating Spin-Lattice Relaxation Time $T_{1L}$>

The spin-lattice relaxation time $T_{1L}$ of a long component is calculated from decay of a signal intensity I (τ) corresponding to a chemical shift of 129 ppm by acquiring a $^{13}$C-NMR spectrum by a Torchia pulse sequence using an NMR device for solid sample measurement and changing a value of a waiting time τ in the aforementioned pulse sequence.

[2] A method for producing a poly(biphenyl ether sulfone) resin which is a method for producing a poly(biphenyl ether sulfone) resin by a polycondensation reaction of a 4,4'-dihalogenodiphenyl sulfone compound and 4,4'-dihydroxybiphenyl in an aprotic polar solvent, wherein a calculated mass A of a poly(biphenyl ether sulfone) resin to be obtained by the aforementioned polycondensation reaction and a charged mass B of the aforementioned aprotic polar solvent satisfy the following formula (5).

$$35 \leq A \times 100 \div (A+B) \leq 44 \quad (5)$$

[3] The method for producing a poly(biphenyl ether sulfone) resin according to the above [2], wherein the aforementioned 4,4'-dihalogenodiphenyl sulfone compound is 4,4'-dichlorodiphenyl sulfone.

[4] A melt-molded article including the poly(biphenyl ether sulfone) resin according to the above [1].

In addition, the present invention includes the following aspects.

<1> A poly(biphenyl ether sulfone) resin substantially comprising a repeating structure of the following formula (1) and having a spin-lattice relaxation time $T_{1L}$ calculated from the following <Method for calculating spin-lattice relaxation time $T_{1L}$> of 24 s or more.

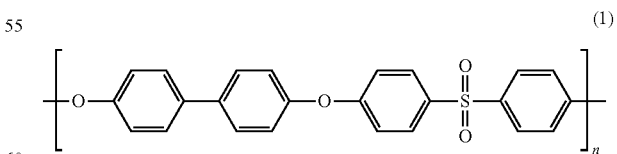

(1)

[In the formula, n represents an integer of 1 or more.]
<Method for Calculating Spin-Lattice Relaxation Time $T_{1L}$>

The spin-lattice relaxation time $T_{1L}$ of a long component is calculated from decay of a signal intensity I (τ) corresponding to a chemical shift of 129 ppm by acquiring a $^{13}$C-NMR spectrum of the aforementioned poly(biphenyl ether sulfone) resin by a Torchia pulse sequence using an NMR device for solid sample measurement and changing a value of a waiting time τ in the aforementioned pulse sequence.

<2> A method for producing a poly(biphenyl ether sulfone) resin substantially comprising a repeating structure of the following formula (1), the method including allowing a polycondensation reaction of a 4,4'-dihalogenodiphenyl sulfone compound and 4,4'-dihydroxybiphenyl in an aprotic polar solvent,

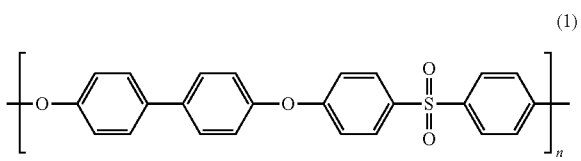

(1)

[In the formula, n is the same as defined above.]

wherein the aforementioned polycondensation reaction is carried out so that a calculated mass A of a poly(biphenyl ether sulfone) resin to be obtained by the aforementioned polycondensation reaction and a charged mass B of the aforementioned aprotic polar solvent satisfy the following formula (5).

$$35 \leq A \times 100 \div (A+B) \leq 44 \quad (5)$$

<3> The method for producing a poly(biphenyl ether sulfone) resin according to <2>, wherein the aforementioned 4,4'-dihalogenodiphenyl sulfone compound is 4,4'-dichlorodiphenyl sulfone.

<4> A melt-molded article including the poly(biphenyl ether sulfone) resin according to <1>.

Effects of the Invention

The melt-molded article obtained from the poly(biphenyl ether sulfone) resin of the present invention exhibits excellent impact resistance and has little change in impact resistance before and after thermal annealing, that is, it is less susceptible to thermal aging.

EMBODIMENTS FOR CARRYING OUT THE INVENTION

Hereinafter, the present invention will be described in detail.

<<Poly(Biphenyl Ether Sulfone) Resin>>

A poly(biphenyl ether sulfone) resin of the present invention substantially comprises a repeating structure of the following formula (1).

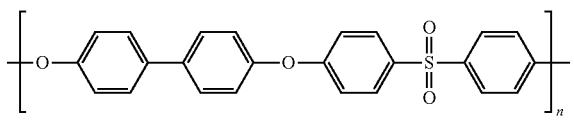

(1)

[In the formula, n represents an integer of 1 or more.]

The poly(biphenyl ether sulfone) resin of the present invention can be represented by, for example, the following formula (1-2), formula (1-3) or formula (1-4). A poly(biphenyl ether sulfone) resin (1-2) represented by the following formula (1-2) and having a halogen atom at the end has a higher thermal decomposition temperature, is less likely to be colored and has a higher thermal stability than a poly (biphenyl ether sulfone) resin (1-3) represented by the following formula (1-3) and having a phenolic hydroxyl group at the end, and a poly(biphenyl ether sulfone) resin (1-4) represented by the following formula (1-4) and having a methoxy group at the end.

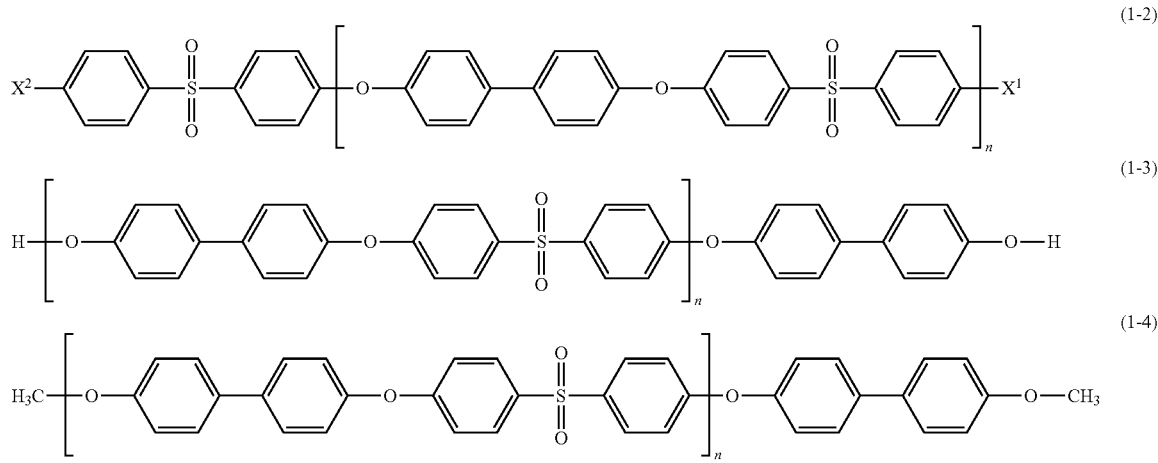

[In the formula, $X^1$ and $X^2$ each independently represent a halogen atom, and n represents an integer of 1 or more.]

In the present specification, the expression "poly(biphenyl ether sulfone) resin substantially comprises a repeating structure of the above formula (1)" means that the mass of the repeating structure of the above formula (1) is 90% by mass or more, more preferably 95% by mass or more, and more specifically, may be 90% by mass or more and 100% by mass or less, and more preferably 95% by mass or more and 100% by mass or less, with respect to the total mass of the poly(biphenyl ether sulfone) resin.

Although n represents an integer of 1 or more, the poly(biphenyl ether sulfone) resin of the present invention may be a mixture containing a compound in which n is an integer of 1 or 2 or more, and n may be an integer of 10,000 or less.

The poly(biphenyl ether sulfone) resin of the present invention has a spin-lattice relaxation time $T_{1L}$ calculated from a <Method for calculating spin-lattice relaxation time $T_{1L}$> of 24 s or more.

<Method for Calculating Spin-Lattice Relaxation Time $T_{1L}$>

The spin-lattice relaxation time $T_{1L}$ of a long component is calculated from decay of a signal intensity I (τ) corresponding to a chemical shift of 129 ppm by acquiring a $^{13}$C-NMR spectrum of a poly(biphenyl ether sulfone) resin by a Torchia pulse sequence using an NMR device for solid sample measurement and changing a value of a waiting time τ in the aforementioned pulse sequence.

The $^{13}$C-NMR spectrum by the Torchia pulse sequence is obtained by the method described in Torchia, D. A., J. Magn. Reson., 30, 613-616 (1978).

In the $^{13}$C-NMR spectrum of the poly(biphenyl ether sulfone) resin, one of the peaks of the main chain is detected at a chemical shift of 129 ppm, and the spin-lattice relaxation time thereof can be separated into a short component and a long component. The relaxation time $T_{1L}$ refers to the spin-lattice relaxation time of the longer component. More specifically, the relaxation time $T_{1L}$ can be calculated from the fitting using the least squares method described in the section entitled <Calculation of $^{13}$C-NMR relaxation time $T_{1L}$> described later.

The form of the measurement sample of the poly(biphenyl ether sulfone) resin to be measured may be a powder sample or a melt-molded sample, but the powder sample is preferable because of the simplicity and convenience of sampling at the time of measurement.

Examples of the NMR device for measuring a solid sample include a 400 MHz NMR device (manufactured by JEOL Ltd., Bruker Corporation, Agilent Technologies, Inc., Varian, Inc., and the like).

The above relaxation time $T_{1L}$ of the poly(biphenyl ether sulfone) resin of the present invention is 24.0 s or more, preferably 24.2 s or more, more preferably 24.5 s or more, and particularly preferably 25.0 s or more. By ensuring that the above relaxation time $T_{1L}$ is equal to or more than the lower limit value, when the poly(biphenyl ether sulfone) resin is formed into a melt-molded article, the degree of reduction in impact resistance can be further reduced even when being thermally annealed. The upper limit of the above relaxation time $T_{1L}$ is not particularly limited, but it is usually 40 s.

That is, the above relaxation time $T_{1L}$ is preferably 24.0 s or more and 40 s or less, 24.2 s or more and 40 s or less, 24.5 s or more and 40 s or less, or 25.0 s or more and 40 s or less.

By adjusting the polymerization concentration (%) defined from the calculated mass A of the poly(biphenyl ether sulfone) resin to be obtained by the polycondensation reaction and the charged mass B of the aprotic polar solvent by the formula: [A×100/(A+B)] to 35% or more and 44% or less, the above relaxation time $T_{1L}$ can be controlled to 24.0 s or more.

The mass average molecular weight (Mw, polystyrene standard) of the poly(biphenyl ether sulfone) resin of the present invention can be set to 60,000 to 90,000, 62,000 to 80,000, 64,000 to 76,000, or 67,000 to 71,000.

The polydispersity (Mw/Mn) of the poly(biphenyl ether sulfone) resin of the present invention can be set to 1.5 to 8.0, 2.0 to 7.0, 3.0 to 6.0 or 4.5 to 4.8.

One aspect of the present invention is a poly(biphenyl ether sulfone) resin having a mass average molecular weight (Mw, polystyrene standard) of 67,000 to 71,000 and a polydispersity (Mw/Mn) of 4.5 to 4.8.

The mass average molecular weight (Mw), number average molecular weight (Mn) and polydispersity (Mw/Mn) of the poly(biphenyl ether sulfone) resin are measured on a standard polystyrene basis by gel permeation chromatography (GPC) using a styrene divinylbenzene-based column <<Method for Producing Poly(Biphenyl Ether Sulfone) Resin>>

A method for producing a poly(biphenyl ether sulfone) resin of the present invention is a method for producing a poly(biphenyl ether sulfone) resin by a polycondensation reaction of a 4,4'-dihalogenodiphenyl sulfone compound and 4,4'-dihydroxybiphenyl in an aprotic polar solvent.

The 4,4'-dihalogenodiphenyl sulfone compound used in the method for producing a poly(biphenyl ether sulfone) resin is a compound represented by the following formula (2).

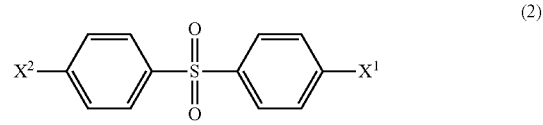

(2)

[In the formula, $X^1$ and $X^2$ each independently represent a halogen atom.]

In the formula (2), examples of the halogen atom represented by $X^1$ and $X^2$ include a fluorine atom, a chlorine atom and a bromine atom. Examples of the 4,4'-dihalogenodiphenyl sulfone compound include 4,4'-difluorodiphenyl sulfone, 4,4'-dichlorodiphenyl sulfone and 4,4'-dibromodiphenyl sulfone.

The 4,4'-dihydroxybiphenyl used in the present invention is a compound represented by the formula (3).

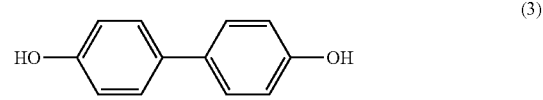 [SMILES: Oc1ccc(-c2ccc(O)cc2)cc1]

(3)

In one aspect of the present invention, the method for producing a poly(biphenyl ether sulfone) resin represented by the following formula (1-2) can be represented by the following reaction formula (4), for example, when a polycondensation reaction is conducted, using an alkali metal carbonate, with an excessive amount of the 4,4'-dihalogenodiphenyl sulfone compound (2).

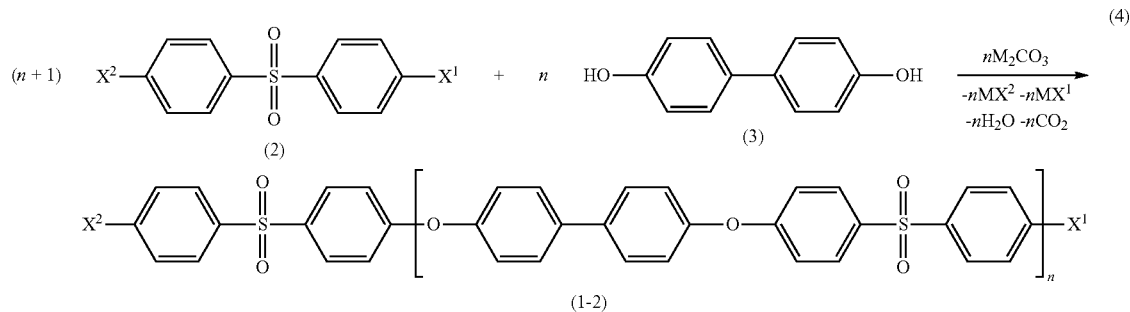

[In the formula, $X^1$ and $X^2$ are the same as defined above, M represents an alkali metal, and n represents an integer of 1 or more.]

In the method for producing a poly(biphenyl ether sulfone) resin of the present invention, the calculated mass A of the poly(biphenyl ether sulfone) resin to be obtained by the above polycondensation reaction and the charged mass B of the above aprotic polar solvent satisfy the following formula (5).

$$35 \leq A \times 100 \div (A+B) \leq 44 \quad (5)$$

When the number of moles of the charged 4,4'-dihalogenodiphenyl sulfone compound (2) is equal to or more than the number of moles of the charged 4,4'-dihydroxybiphenyl (3) (for example, when 1 to 1.10 moles, preferably 1.02 to 1.05 moles, of the 4,4'-dihalogenodiphenyl sulfone compound (2) is used with respect to 1 mole of 4,4'-dihydroxybiphenyl (3)), the calculated mass A of the poly(biphenyl ether sulfone) resin (1-2) represented by the above formula (1-2) and obtained by the above polycondensation reaction can be determined as the amount obtained by subtracting the mass of hydrogen halides ($HX^1$, $HX^2$) corresponding to twice the number of moles of the charged mass of the 4,4'-dihydroxybiphenyl (3) from the sum of the charged mass of the 4,4'-dihalogenodiphenyl sulfone compound (2) and the charged mass of the 4,4'-dihydroxybiphenyl (3) in the above reaction formula (4). Here, when the above halogen atoms $X^1$ and $X^2$ are different from each other, the above subtracted mass is the sum of the mass of hydrogen halide ($HX^1$) corresponding to the same number of moles as the charged mass of the 4,4'-dihydroxybiphenyl (3) and the mass of hydrogen halide ($HX^2$) corresponding to the same number of moles as the charged mass of the 4,4'-dihydroxybiphenyl (3).

When the number of moles of the charged 4,4'-dihalogenodiphenyl sulfone compound (2) is less than the number of moles of the charged 4,4'-dihydroxybiphenyl (3) (for example, when 0.90 to 1 mole, preferably 0.95 to 0.98 moles of the 4,4'-dihalogenodiphenyl sulfone compound (2) is used with respect to 1 mole of the 4,4'-dihydroxybiphenyl (3)), a poly(biphenyl ether sulfone) resin (1-3) represented by the above formula (1-3) is obtained by the same polycondensation reaction as in the above reaction formula (4). Furthermore, the poly(biphenyl ether sulfone) resin (1-3) is reacted with methyl halide to obtain a poly(biphenyl ether sulfone) resin (1-4) represented by the above formula (1-4). The calculated mass A of the poly(biphenyl ether sulfone) resin (1-3) represented by the above formula (1-3) and the poly(biphenyl ether sulfone) resin (1-4) represented by the above formula (1-4) obtained by the above polycondensation reaction can be determined as the amount obtained by subtracting the mass of hydrogen halides ($HX^1$, $HX^2$) corresponding to twice the number of moles of the charged mass of the 4,4'-dihalogenodiphenyl sulfone compound (2) from the sum of the charged mass of the 4,4'-dihalogenodiphenyl sulfone compound (2) and the charged mass of the 4,4'-dihydroxybiphenyl (3). Here, when the above halogen atoms $X^1$ and $X^2$ are different from each other, the above subtracted mass is the sum of the mass of hydrogen halide ($HX^1$) corresponding to the same number of moles as the charged mass of the 4,4'-dihalogenodiphenyl sulfone compound (2) and the mass of hydrogen halide ($HX^2$) corresponding to the same number of moles as the charged mass of the 4,4'-dihalogenodiphenyl sulfone compound (2).

In the method for producing a poly(biphenyl ether sulfone) resin of the present invention, the polymerization concentration (%) defined by the formula: $[A \times 100 \div (A+B)]$ is 35% or more and 44% or less. The poly(biphenyl ether sulfone) resin produced under the conditions satisfying the condition of the formula (5) can be made to have the above relaxation time $T_{1L}$ of 24 s or more. The polymerization concentration is preferably 43% or less, and more preferably 42% or less. By ensuring that the polymerization concentration is equal to or less than the above upper limit value, the above relaxation time $T_{1L}$ can be set to 24 s or more, and a poly(biphenyl ether sulfone) resin exhibiting little decrease in impact resistance before and after thermal annealing can be obtained. The polymerization concentration is preferably 37% or more, more preferably 39% or more, and particularly preferably 41% or more. By ensuring that the polymerization concentration is equal to or more than the above lower limit value, the polycondensation reaction can be efficiently carried out in a short period of time.

That is, the polymerization concentration may be, for example, 35% or more and 44% or less, 37% or more and 44% or less, 39% or more and 44% or less, 39% or more and 43% or less, 41% or more and 44% or less, 39% or more and 42% or less, 41% or more and 43% or less, or 41% or more and 42% or less.

Although the polycondensation reaction is carried out in an aprotic polar solvent, it is not a homogeneous reaction but a reaction in a slurry state. For this reason, for the structure of the poly(biphenyl ether sulfone) resin as a reaction product between the polymer molecules, when the polymerization concentration defined by the formula: $[A \times 100 \div (A+B)]$ is different, even if the mass average molecular weight Mw and polydispersity Mw/Mn are the same, it is considered that those in which the entanglement of polymer molecules is different are produced. Further, by ensuring that the polymerization concentration is equal to or less than the above upper limit value, it is considered that the above relaxation time $T_{1L}$ can be set to 24 s or more, and a poly(biphenyl ether sulfone) resin capable of providing a melt-molded article having excellent impact resistance and little change in impact resistance before and after thermal annealing, that is, less susceptible to thermal aging, can be obtained.

The amount of the 4,4'-dihalogenodiphenyl sulfone compound (2) used is usually about 0.90 to 1.10 moles or 0.95 to 1.05 moles, preferably 0.95 to 0.98 moles or 0.96 to 0.98 moles, or 1.02 to 1.05 moles or 1.02 to 1.04 moles, with respect to 1 mole of the 4,4'-dihydroxybiphenyl (3). When it is 0.95 moles or more and 1.05 moles or less, the molecular weight of the obtained poly(biphenyl ether sulfone) resin tends to be high, which is preferable.

In the method for producing a poly(biphenyl ether sulfone) resin, an alkali metal carbonate and/or an alkali metal bicarbonate can be used as a base catalyst. Examples of the alkali metal carbonate include potassium carbonate and sodium carbonate, and examples of the alkali metal bicarbonate include potassium hydrogen carbonate and sodium hydrogen carbonate, and potassium carbonate is usually used.

Further, it is preferable to use an alkali metal carbonate and/or alkali metal bicarbonate powder for the base catalyst.

The amount of the alkali metal carbonate and/or alkali metal bicarbonate used is usually 1 mole or more and 1.2 moles or less, but may be 1.01 moles or more and 1.15 moles or less, or may be 1.02 moles or more and 1.15 moles or less, with respect to 1 mole of the 4,4'-dihydroxybiphenyl (3).

Examples of the aprotic polar solvent used in the present invention include a sulfone-based solvent, an amide-based solvent, a lactone-based solvent, a sulfoxide-based solvent, an organic phosphorus-based solvent and a cellosolve-based solvent. Examples of the sulfone-based solvent include diphenyl sulfone, dimethyl sulfone, diethyl sulfone and sulfolane. Examples of the amide-based solvent include N,N-dimethylacetamide, N-methyl-pyrrolidone, N-methyl-caprolactam, N,N-dimethylformamide, N,N-diethylformamide, N,N-diethylacetamide, N-methylpropionamide and dimethylimidazolidinone. Examples of the lactone-based solvent include γ-butyl lactone and β-butyl lactone. Examples of the sulfoxide-based solvent include dimethyl sulfoxide and methylphenyl sulfoxide. Examples of the organic phosphorus-based solvent include tetramethylphosphoric amide and hexamethylphosphoric amide. Examples of the cellosolve-based solvent include ethyl cellosolve acetate and methyl cellosolve acetate.

As the aprotic polar solvent used in the present invention, a sulfone-based solvent is preferable, and diphenyl sulfone is more preferable.

The temperature of the polycondensation reaction is preferably 180° C. to 300° C., and more preferably 240° C. to 300° C. A temperature of 240° C. or higher is preferable because the reaction rate of polymerization tends to improve, and a temperature of 300° C. or lower is preferable because the molecular weight dispersion of the obtained poly(biphenyl ether sulfone) resin tends to decrease. The time required for the polycondensation reaction is usually about 3 to 20 hours.

The polycondensation reaction proceeds in this manner, but in order to obtain a poly(biphenyl ether sulfone) resin from the reaction mixture after the reaction, for example, the reaction mixture after the reaction may be solidified, powdered, and then washed with a solvent. The reaction mixture after the reaction may be cooled for solidification, and can be solidified by cooling to about room temperature. For making the solidified reaction mixture into a powder, the reaction mixture may be pulverized. As the solvent used for washing, an alkali metal salt such as an alkali metal halide generated by polymerization and a solvent capable of dissolving an aprotic polar solvent without dissolving the poly(biphenyl ether sulfone) resin are used, and, for example, water, an aliphatic ketone such as acetone or methyl ethyl ketone, an aliphatic alcohol such as methanol, ethanol or isopropanol, or a mixed solvent thereof and the like can be used.

<<Melt-Molded Article>>

A melt-molded article of the present invention comprises the poly(biphenyl ether sulfone) resin of the present invention. A form of the melt-molded article of the present invention may be a powder form, a pellet form, a film or a sheet, a long molded article obtained by extrusion molding, or an injection molded article. For example, the poly(biphenyl ether sulfone) resin can be obtained as a film or a sheet by hot pressing, can be obtained as a long molded article by extrusion molding, can be subjected to T-die molding to mold a film, can be subjected to blow molding to mold a hollow product such as various containers, building materials and sporting goods, and can be obtained as an injection molded article by injection molding. The injection molded article can be produced by injection molding the poly(biphenyl ether sulfone) resin, for example, at a mold temperature of 120 to 180° C. and a resin melting temperature of 330 to 380° C. using a general injection molding machine. Since the poly(biphenyl ether sulfone) resin of the present invention is used, the melt-molded article of the present invention can be made to exhibit excellent impact resistance and to have little change in impact resistance before and after thermal annealing, that is, to be less susceptible to thermal aging.

The melt-molded article of the present invention can be made to have an impact resistance, as indicated by Izod impact resistance values, of 200 to 2,000 J/m, 400 to 1,500 J/m, 500 to 1,000 J/m or 600 to 800 J/m.

The Izod impact resistance [J/m] of the melt-molded article is measured in accordance with ASTM D256 using a test piece having dimensions of 70 mm in length, 10 mm in width and 1.9 mm in thickness and having a notch with a tip radius of 0.25 mm and a depth of 5 mm in a central portion which is produced by the method described in the section entitled [Impact resistance test] described later.

The test piece may be produced by using a powder obtained by freezing and crushing a melt-molded article with a freeze crusher described later, instead of the "poly (biphenyl ether sulfone) resin" described in the section entitled [Impact resistance test] described later.

The thermal aging properties of the melt-molded article of the present invention can be evaluated by the Izod impact resistance after thermal annealing by placing in an oven at 180° C. and leaving to stand for 24 hours. For the melt-molded article of the present invention, the Izod impact resistance after thermal annealing can be made substantially the same as the Izod impact resistance before thermal annealing, and the Izod impact resistances before and after thermal annealing can be adjusted to 200 to 2,000 J/m, 400 to 1,500 J/m, 500 to 1,000 J/m, and 600 to 800 J/m, respectively.

One aspect of the melt-molded article of the present invention is that the change in the Izod impact resistance after thermal annealing is in the range of −50% to +50%, preferably −30% to +30%, more preferably −10% to +30%, more preferably −7% to +30%, and still more preferably −7% to +10%, with respect to the Izod impact resistance before thermal annealing.

One aspect of the poly(biphenyl ether sulfone) resin of the present invention is to have a characteristic capable of producing the above melt-molded article.

Another aspect of the poly(biphenyl ether sulfone) resin of the present invention is to have a characteristic in which when a test piece having dimensions of 70 mm in length, 10 mm in width and 1.9 mm in thickness and having a notch with a tip radius of 0.25 mm and a depth of 5 mm in a central portion is produced by the method described in the section entitled [Impact resistance test] described later and the Izod impact resistance [J/m] is measured in accordance with ASTM D256, it is 200 to 2,000 J/m, preferably 400 to 1,500 J/m, more preferably 500 to 1,000 J/m and still more preferably 600 to 800 J/m.

Another aspect of the poly(biphenyl ether sulfone) resin of the present invention is to have a characteristic in which when the above test piece is further placed in an oven at 180° C. and the Izod impact resistance is measured after thermal annealing by leaving it to stand for 24 hours, the Izod impact resistances before and after thermal annealing are 200 to 2,000 J/m, preferably 400 to 1,500 J/m, more preferably 500 to 1,000 J/m and still more preferably 600 to 800 J/m, respectively.

Yet another aspect of the poly(biphenyl ether sulfone) resin of the present invention is to have a characteristic in which the change in the Izod impact resistance of the above test piece after the thermal annealing is in the range of −50% to +50%, preferably −30% to +30%, more preferably −10% to +30%, more preferably −7% to +30%, and still more preferably −7% to +10%, with respect to the Izod impact resistance before the thermal annealing.

EXAMPLES

Hereinafter, the present invention will be described in more detail with reference to specific examples. However, the present invention is not limited in any way by the examples shown below.

<Measurement of Mn and Mw of Poly(Biphenyl Ether Sulfone) Resin, Calculation of Mw/Mn>

The polystyrene equivalent mass average molecular weight (Mw), number average molecular weight (Mn) and polydispersity (Mw/Mn) of a poly(biphenyl ether sulfone) resin were determined by GPC measurement under the following measurement conditions.

[Measurement Conditions]

Sample: 0.025 g of poly(biphenyl ether sulfone) resin to be measured was added to 10 mL of an N,N-dimethylformamide solution containing 10 mM lithium bromide.

Sample injection volume: 10 μL

Column (stationary phase): Two columns of "TSKgel SuperHZM-M (base material: styrene divinylbenzene)" (4.6 mmφ×150 mm) manufactured by Tosoh Corporation were connected in series.

Column temperature: 40° C.

Eluent (mobile phase): N,N-dimethylformamide containing 10 mM lithium bromide

Eluent flow rate: 0.35 mL/min

Detector: UV detector

Detection wavelength: 300 nm

Molecular weight standard: polystyrene

<Calculation of $^{13}$C-NMR Relaxation Time $T_{1L}$>

The relaxation time $T_{1L}$ of $^{13}$C-NMR of the poly(biphenyl ether sulfone) resin to be measured was calculated from decay of a signal intensity I (τ) corresponding to a chemical shift of 129 ppm corresponding to $^{13}$C of the main chain of the poly(biphenyl ether sulfone) resin by acquiring a $^{13}$C-NMR spectrum by a Torchia pulse sequence using an NMR device for solid sample measurement and changing a value of a waiting time τ in the pulse sequence.

The obtained signal strength I (τ) can be expressed by the following formula (F1), and the relaxation time $T_{1L}$ was calculated from the fitting using the least squares method by plotting I(τ) against time τ. The unit of the relaxation time $T_{1L}$ is seconds [s].

$$I(\tau)=a_1\times\exp(-\tau/T_{1S})+a_2\times\exp(-\tau/T_{1L}) \quad (F1)$$

[In the formula, $a_1$ and $a_2$ represent coefficients calculated so that the sum of the first term and the second term in the formula (F1) by fitting by the least squares method is equivalent to the signal intensity I(τ) obtained by the measurement. $T_{1S}$ and $T_{1L}$ represent relaxation times calculated by fitting by the least squares method so that $T_{1S}<T_{1L}$.]

<Solid $^{13}$C-NMR Measurement>

In the examples, the solid $^{13}$C-NMR measurement for calculating the relaxation time $T_{1L}$ was performed under the following measurement conditions using a method of observing the magnetization of $^{13}$C after transferring the magnetization of $^1$H to $^{13}$C.

Measuring device: PS400WB (manufactured by Varian, Inc.)

Static magnetic field strength: 9.4 Tesla (resonant frequency: 400 MHz ($^1$H))

Magic angle spinning: 10 kHz (10,000 rotations per second)

Contact time: 2 ms

Repetition time: 6 s

Number of integrations: 1,024 times

Sample: powder form (about 15 mg)

Temperature: 25° C.

Chemical shift reference material: adamantane

Waiting time τ: 0.02 s, 0.054 s, 0.15 s, 0.4 s, 1.09 s, 2.98 s, 8.1 s, 22 s

<Impact Resistance Test>

A poly(biphenyl ether sulfone) resin to be measured was placed in a cavity portion of an SUS spacer having a thickness of 2 mm and sandwiched between a pair of flat aluminum plates. Furthermore, the entirety thereof was sandwiched between a pair of flat steel plates and preheated at 305° C. for 13 minutes in a hot press machine, and was then heated and compressed for 2 minutes at a pressure which was sufficient for fusing the poly(biphenyl ether sulfone) resin to make the thickness the same as that of the SUS spacer. Then, the resultant was cooled with a cooling press machine set at 25° C. to obtain a plate having a thickness of 1.9 mm. The obtained molded plate was cut into a test piece having dimensions of 70 mm in length, 10 mm in width and 19 mm in thickness and having a notch with a tip radius of 0.25 mm and a depth of 5 mm in a central portion, and the Izod impact resistance [J/m] was measured in accordance with ASTM D256.

<Thermal Aging Test>

The test piece was molded, and then placed in an oven at 180° C. and left to stand for 24 hours, and the resultant was used as a test piece after thermal annealing in an impact resistance test. The impact resistance test was conducted in accordance with ASTM D256.

<Production of Poly(Biphenyl Ether Sulfone) Resin>

Example 1

Mixed were 100.0 parts by mass (1 molar ratio) of 4,4'-dihydroxybiphenyl, 159.0 parts by mass (1.031 molar ratio) of 4,4'-dichlorodiphenyl sulfone and 308.5 parts by mass of diphenyl sulfone, in a polymerization vessel equipped with a stirrer, a nitrogen inlet tube, a thermometer, and a condenser attached with a receiver at the tip, and the temperature was raised to 180° C. while causing nitrogen gas to flow into the system. Added was 76.4 parts by mass (1.030 molar ratio) of potassium carbonate to the obtained mixed solution, and then the temperature was gradually raised to 290° C. and the reaction was further carried out at 290° C. for 4.5 hours. Subsequently, the obtained reaction mixture solution was cooled to room temperature to be solidified, finely pulverized, and then washed several times by decantation and filtration using warm water and a mixed solvent of acetone and methanol. The obtained solid was heated and dried at 150° C. to obtain a poly(biphenyl ether sulfone) resin of Example 1. Table 1 shows the polymerization concentration, mass average molecular weight Mw and polydispersity Mw/Mn, the relaxation time $T_{1L}$ measured using the powder obtained as a polymerization product, and the evaluation results of the impact resistance test and thermal aging test.

It should be noted that when determining the polymerization concentration in Example 1, the calculated mass A of the poly(biphenyl ether sulfone) resin obtained by the polycondensation reaction was determined as the amount (219.8 parts by mass) obtained by subtracting the mass of hydrogen halide (2×36.46×0.537) corresponding to twice the number of moles of the charged mass of 4,4'-dihydroxybiphenyl from the sum (259.0 parts by mass) of the charged mass (159.0 parts by mass) of the 4,4'-dihalogenodiphenyl sulfone compound and the charged mass (100.0 parts by mass) of 4,4'-dihydroxybiphenyl. The polymerization concentration was calculated from the formula: 219.8×100=(219.8+308.5).

The poly(biphenyl ether sulfone) resin of Example 1 had a relaxation time $T_{1L}$ of 24 s or more, and the melt-molded article obtained from the poly(biphenyl ether sulfone) resin exhibited excellent impact resistance and had little change in impact resistance before and after thermal annealing, that is, was less susceptible to thermal aging.

Example 2

A poly(biphenyl ether sulfone) resin of Example 2 was obtained under the same conditions as in Example 1 except that the amount of diphenyl sulfone was 308.9 parts by mass and the amount of potassium carbonate was 76.1 parts by mass (1.025 molar ratio), and the reaction time at 290° C. was 4 hours. Table 1 shows the polymerization concentration, mass average molecular weight Mw and polydispersity Mw/Mn, the relaxation time $T_{1L}$ measured using the powder obtained as a polymerization product, the relaxation time $T_{1L}$ measured using the powder obtained by freezing and crushing the test piece formed during the impact resistance test, and the evaluation results of the impact resistance test and thermal aging test.

Freezing and crushing were carried out under the following conditions by filling a stainless steel container with a sample.

Freeze crusher: Freezer Mill 6770 manufactured by SPEX SamplePrep, LLC.

Temperature: liquid nitrogen temperature
Crushing time: 3 minutes

The poly(biphenyl ether sulfone) resin of Example 2 had a relaxation time $T_{1L}$ of 24 s or more, and the relaxation time $T_{1L}$ of the melt-molded article obtained from the poly (biphenyl ether sulfone) resin was also 24 s or more. That is, it was confirmed that the relaxation time $T_{1L}$ measured while the poly(biphenyl ether sulfone) resin of Example 2 was in a state of the powder as a polymerization product and the relaxation time $T_{1L}$ measured for the melt-molded article obtained by producing pellets from the polymerized powder by melt extrusion molding, followed by further melt molding were substantially the same. The above melt-molded article exhibited excellent impact resistance and had little change in impact resistance before and after thermal annealing, that is, was less susceptible to thermal aging.

Example 3

A poly(biphenyl ether sulfone) resin of Example 3 was obtained under the same conditions as in Example 1 except that the amount of 4,4'-dichlorodiphenyl sulfone was 158.8 parts by mass (1.030 molar ratio), the amount of diphenyl sulfone was 306.8 parts by mass and the amount of potassium carbonate was 78.0 parts by mass (1.050 molar ratio), and the reaction time at 290° C. was 4 hours. Table 1 shows the polymerization concentration, mass average molecular weight Mw and polydispersity Mw/Mn, and the relaxation time $T_{1L}$ measured using the powder obtained as a polymerization product. The poly(biphenyl ether sulfone) resin of Example 3 had a relaxation time $T_{1L}$ of 24 s or more.

Comparative Example 1

Mixed were 100.0 parts by mass (1 molar ratio) of 4,4'-dihydroxybiphenyl, 159.0 parts by mass (1.031 molar ratio) of 4,4'-dichlorodiphenyl sulfone and 213.4 parts by mass of diphenyl sulfone, in a polymerization vessel equipped with a stirrer, a nitrogen inlet tube, a thermometer, and a condenser attached with a receiver at the tip, and the temperature was raised to 180° C. while causing nitrogen gas to flow into the system. Added was 77.2 parts by mass (1.040 molar ratio) of potassium carbonate to the obtained mixed solution, and then the temperature was gradually raised to 290° C. and the reaction was further carried out at 290° C. for 4 hours. Subsequently, the obtained reaction mixture solution was cooled to room temperature to be solidified, finely pulverized, and then washed several times by decantation and filtration using warm water and a mixed solvent of acetone and methanol. The obtained solid was heated and dried at 150° C. to obtain a poly(biphenyl ether sulfone) resin of Comparative Example 1. Table 1 shows the polymerization concentration, mass average molecular weight Mw and polydispersity Mw/Mn, the relaxation time $T_{1L}$ measured using the powder obtained as a polymerization product, the relaxation time $T_{1L}$ measured using the powder obtained by freezing and crushing the test piece formed during the impact resistance test, and the evaluation results of the impact resistance test and thermal aging test.

The poly(biphenyl ether sulfone) resin of Comparative Example 1 had a relaxation time $T_{1L}$ of less than 24 s, and the relaxation time $T_{1L}$ of the melt-molded article obtained by melt molding the poly(biphenyl ether sulfone) resin was also less than 24 s. That is, it was confirmed that the relaxation time $T_{1L}$ measured while the poly(biphenyl ether sulfone) resin of Comparative Example 1 was in a state of the powder as a polymerization product and the relaxation time $T_{1L}$ measured for the melt-molded article obtained by producing pellets from the polymerized powder by melt extrusion molding, followed by further melt molding were substantially the same. The above melt-molded article exhibited a significant reduction in impact resistance when thermal annealing was performed, that is, was susceptible to thermal aging.

Comparative Example 2

A poly(biphenyl ether sulfone) resin of Comparative Example 2 was obtained under the same conditions as in Comparative Example 1 except that the amount of diphenyl sulfone was 214.9 parts by mass and the amount of potassium carbonate was 75.7 parts by mass (1.020 molar ratio). Table 1 shows the polymerization concentration, mass average molecular weight Mw and polydispersity Mw/Mn, the relaxation time $T_{1L}$ measured using the powder obtained as a polymerization product, and the evaluation results of the impact resistance test and thermal aging test.

The poly(biphenyl ether sulfone) resin of Comparative Example 2 had a relaxation time $T_{1L}$ of less than 24 s, and the melt-molded article obtained by melt molding the poly(biphenyl ether sulfone) resin exhibited a significant reduction in impact resistance when thermal annealing was performed, that is, was susceptible to thermal aging.

TABLE 1

| Examples | DCDPS/BP molar ratio | K$_2$CO$_3$/BP molar ratio | Polymerization concentration [%] | Mw | Mw/Mn | T$_{1L}$ measured using powder obtained as polymerization product [s] | T$_{1L}$ measured by freezing and crushing molded article [s] | Impact resistance test before thermal annealing [J/m] | Thermal aging test after thermal annealing [J/m] |
|---|---|---|---|---|---|---|---|---|---|
| Ex. 1 | 1.031 | 1.030 | 42 | 70900 | 4.7 | 25.8 | — | 649 | 614 |
| Ex. 2 | 1.031 | 1.025 | 42 | 69400 | 4.7 | 26.2 | 25.0 | 623 | 796 |
| Ex. 3 | 1.030 | 1.050 | 42 | 68300 | 4.7 | 25.2 | — | — | — |
| Comp. Ex. 1 | 1.031 | 1.040 | 51 | 71500 | 4.9 | 22.8 | 21.5 | 519 | 30 |
| Comp. Ex. 2 | 1.031 | 1.020 | 51 | 60000 | 4.7 | 22.4 | — | 233 | 50 |

DCDPS: 4,4'-dichlorodiphenyl sulfone
BP: 4,4'-dihydroxybiphenyl

The poly(biphenyl ether sulfone) resins of Examples 1 to 3 were produced by adjusting the polymerization concentration defined from the calculated mass A of the poly(biphenyl ether sulfone) resin to be obtained by the polycondensation reaction and the charged mass B of the aprotic polar solvent by the formula: [A×100÷(A+B)] to a constant concentration of 35% or more and 44% or less. The poly(biphenyl ether sulfone) resins of the examples had relaxation times $T_{1L}$ of 24 s or more, and the melt-molded articles obtained from these poly(biphenyl ether sulfone) resins exhibited excellent impact resistance and had little change in impact resistance before and after thermal annealing, that is, were less susceptible to thermal aging.

On the other hand, the poly(biphenyl ether sulfone) resins of the comparative examples produced under the conditions in which the polymerization concentration defined by the formula: [A×100÷(A+B)] exceeded 44% had relaxation times $T_{1L}$ of less than 24 s despite having about the same mass average molecular weights as those of the poly(biphenyl ether sulfone) resins of the examples. Further, the melt-molded articles obtained from the poly(biphenyl ether sulfone) resins of the comparative examples were inferior in impact resistance to the melt-molded articles obtained from the poly(biphenyl ether sulfone) resins of the examples, and significant reductions in impact resistance were observed after thermal annealing.

INDUSTRIAL APPLICABILITY

The melt-molded article obtained from the poly(biphenyl ether sulfone) resin of the present invention exhibits excellent impact resistance and has little change in impact resistance before and after thermal annealing, that is, it is less susceptible to thermal aging. Such melt-molded articles can be expected to be used in a wide range of applications such as electrical/electronic materials, automobile parts, medical materials, heat resistant coating materials, separation membranes, or resin joints, especially in various applications that are expected to be used in a high temperature atmosphere.

The invention claimed is:

1. A poly(biphenyl ether sulfone) resin substantially comprising a repeating structure of the following formula (1) and having a spin-lattice relaxation time $T_{1L}$ of 24 s or more,

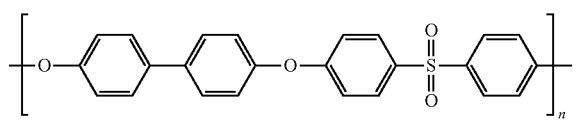

(1)

wherein n represents an integer of 1 or more,
wherein the poly(biphenyl ether sulfone) resin has a mass average molecular weight Mw of 67,000 to 71,000, and
wherein the spin-lattice relaxation time $T_{1L}$ of a long component is calculated from decay of a signal intensity I (τ) corresponding to a chemical shift of 129 ppm by acquiring a $^{13}$C-NMR spectrum of said poly(biphenyl ether sulfone) resin by a Torchia pulse sequence using an NMR device for solid sample measurement and changing a value of a waiting time τ in said pulse sequence.

2. A method for producing the poly(biphenyl ether sulfone) resin according to claim 1, the method comprising allowing a polycondensation reaction of a 4,4'-dihalogenodiphenyl sulfone compound and 4,4'-dihydroxybiphenyl in an aprotic polar solvent,
wherein said polycondensation reaction is carried out so that a calculated mass A of the poly(biphenyl ether sulfone) resin to be obtained by said polycondensation reaction and a charged mass B of said aprotic polar solvent satisfy the following formula (5):

$$35 \leq A \times 100 \div (A+B) \leq 44 \quad (5).$$

3. The method for producing the poly(biphenyl ether sulfone) resin according to claim 2, wherein said 4,4'-dihalogenodiphenyl sulfone compound is 4,4'-dichlorodiphenyl sulfone.

4. A melt-molded article comprising the poly(biphenyl ether sulfone) resin according to claim 1.

5. The poly(biphenyl ether sulfone) resin according to claim 1, wherein the poly(biphenyl ether sulfone) resin has a polydispersity Mw/Mn of 4.5 to 4.8, where Mn corresponds to a number average molecular weight of the poly(biphenyl ether sulfone) resin.

6. The poly(biphenyl ether sulfone) resin according to claim 1, wherein the spin-lattice relaxation time $T_{1L}$ is 40 s or less.

* * * * *